(No Model.)
A. W. MORTON.
Gas Stove or Oven.
No. 235,640. Patented Dec. 21, 1880.
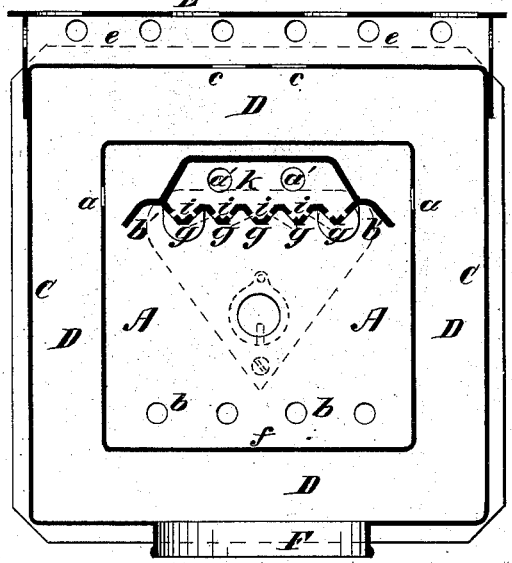
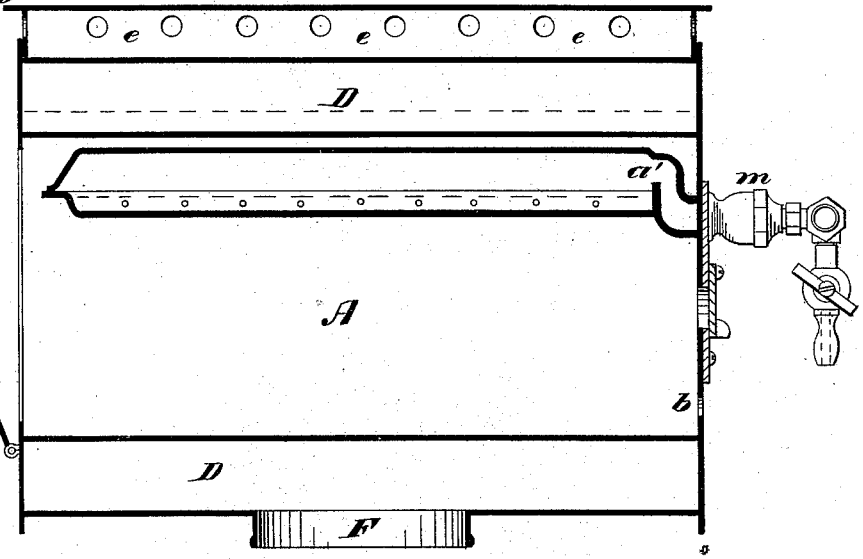
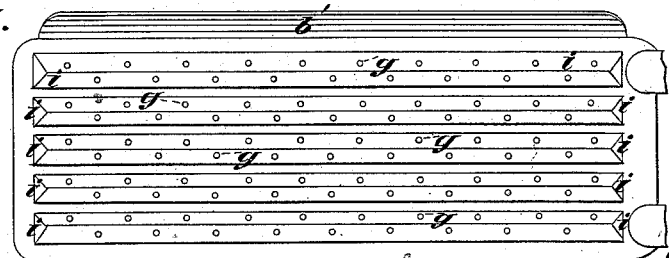
WITNESSES:
J. W. Hamilton Johnson,
Floyd Norris.
INVENTOR.
A. W. Morton,
by James A. Whitney,
Atty.

UNITED STATES PATENT OFFICE.

ALBANUS W. MORTON, OF BROOKLYN, ASSIGNOR TO MORTON GAS STOVE COMPANY, OF NEW YORK, N. Y.

GAS STOVE OR OVEN.

SPECIFICATION forming part of Letters Patent No. 235,640, dated December 21, 1880.

Application filed March 19, 1880. (No model.)

*To all whom it may concern:*

Be it known that I, ALBANUS W. MORTON, of Brooklyn, in the county of Kings and State of New York, have invented certain Improvements in Gas Stoves or Ovens, of which the following is a specification.

This invention is more particularly designed for baking and similar purposes; and its object is to provide for a more efficient and uniform heating of the oven than has been found practicable with the apparatus hitherto devised for like purposes.

The invention comprises a novel combination, with an oven, of a heat-radiating bottom, through which heat is transmitted to the interior of the oven from any suitable heat-giving device external thereto, and a system of naked gas-jets arranged in the top of the oven to provide a practically continuous sheet of naked flame in the upper part of the oven, so that the article to be baked or cooked is subjected simultaneously to the heat radiated or transmitted from the bottom and to the action of the naked flames of the gas-jets at the top, a more efficient cooking of the articles being by this means secured, and also a greatly-increased "browning" effect, so termed, upon the upper parts of said articles, whether the same be loaves of bread, &c., or joints of meat or the like.

The invention also comprises several novel combinations of parts, whereby the practical efficiency of the oven is in various respects materially increased.

Figure 1 is a vertical transverse section of a gas oven or stove embracing the several features of my said invention. Fig. 2 is a longitudinal sectional view of the same, and Fig. 3 is an inverted plan view of a series of gas-burners placed in the top or upper part of the oven.

A is the oven, to which access is had by a door, B, suitably provided at one end. This oven is surrounded by a jacket, C, between which and the oven itself is a space, D. In the upper part of the lateral sides of the oven are openings $a$, and at the lower part of the back end of the oven are other openings, $b$. The openings $b$ communicate with the outer atmosphere; but the openings $a$ communicate with the space D, which latter, in its turn, communicates with the outer atmosphere by means of openings $c$ in the top of the jacket C. Placed upon the said top of the jacket C is a perforated plate, E, which has a circumferential perforated flange, $e$, by which it is attached in place upon the top of the jacket C—in other words, upon the top of the apparatus, as represented in Figs. 1 and 2.

In the bottom of the jacket C, and communicating with the space D, is a large opening, F. The devices for heating the bottom $f$, which I term the "radiating bottom" of the oven, are placed underneath this opening F, so that the flame from the heating apparatus, whether the same be a "gas-jet petroleum-stove," so termed, or anything else, will be directed against the bottom $f$ to heat the same, so that heat will be radiated from said bottom $f$ up into the oven A, the products of combustion from the heating device during such heating of the bottom $f$ passing upward through the space D, and then outward through the openings $c$ into and through the space inclosed by the perforated plate E and its flange $e$. A tea-kettle or other culinary utensil may be placed upon the plate E to be heated.

In the upper part of the oven A is a system or series of gas jets or burners, $g$. These burners are formed by means of suitable holes or openings provided in the opposite sides of each of a number of parallel prism-shaped downwardly-projecting ridges, (indicated at $i$,) the direction of the holes or openings being such that the gas is impelled in directions oblique to the horizontal, so that the jets of flame from any two adjacent surfaces of two opposite ridges, $i$, will tend to cross each other. The holes through which the gas issues, as just mentioned, are "staggered," so to speak—that is to say, the holes in the faces of one of the ridges are placed opposite the spaces between the holes in the opposite ridges, so that the slanting flames, as they approach or cross each other, will be, as it were, interlocked, and thereby provide a sheet of flame the different jets of which interlock with each other, and each flame being propelled in a slanting direction toward its opposing flames. By this means the sheet of flame provided in the top of the oven A is made of greater thickness, is more uniformly diffused, and is more effective in the heating action than could be secured by any other arrangement of burners known to me.

All of the burners $g$, formed as aforesaid, communicate with a large conduit, K, which in its turn is supplied with combustible gas mingled with any suitable proportion of atmospheric air in order to produce the most perfect combustion of the gas as it issues from the jets. This mingled air and gas may be supplied in any ordinary or suitable manner— as, for example, through openings $a'$ at one end of the conduit K, which openings, in their turn, communicate by any suitable means with an inlet-pipe, $m$, through which the mingled gas and atmospheric air is provided, the proportion being of course such as to avoid the formation of an explosive mixture. The proportions ordinarily employed in the Bunsen burner may be stated as approximately those to be preferred.

In order that the products of combustion from the burners may not too rapidly escape from the oven A, reflecting-flanges $b'$ are placed at each lateral edge of the system of the said burners. The escape of the hot products of combustion is principally through the openings $a$ into the space D. Meanwhile air for the support of combustion at the burners is supplied from the outside through the openings $b$.

In the operation of the invention the loaves, joints, or other articles to be cooked are placed in the oven A, the radiating-bottom $f$ is heated by external means, hereinbefore explained, and gas-jets $g$ are ignited, and, the door being closed, the article to be cooked is simultaneously subjected to the heating action of the radiating-bottom $f$ and of the heat radiated and diffused direct from the naked flames of the gas-burners $g$, from which it results that a most efficient cooking action is exerted upon the article, and its upper surface is much more effectually browned, as is desirable in the most excellent cooking, than is possible by any other means; and, furthermore, owing to the effective manner in which the heat is distributed, diffused, and controlled within the oven and the manner in which it is applied to the article to be cooked, a very material economy of fuel in proportion to the cooking effects and actual advantages is obtained. Thus, for example, with my oven, constructed and operating as above set forth, and having its series of burners formed with one hundred and sixty perforations of one-eighth-inch diameter each and a superficial area of fifty square inches, requires less gas than a plain-faced system of burners having only one hundred and thirteen perforations of the same size and thirty-two square inches of superficial surface.

In practice the proportions of my said invention may be varied. Thus, for example, if the oven is circular instead of rectangular, the series of prismatic ridges, instead of being straight and parallel, may be formed in concentric circles; and even in a rectangular oven the ridges, instead of running in straight and unbroken parallelism, may be divided transversely by depression, so as to make the ridges comprise parallel series of pyramidal downwardly-projecting parts, from the sloping sides of which the jets are caused to issue obliquely through perforations in the same manner as from the parallel but sloping sides of the prismatic ridges shown in the drawings and hereinbefore set forth.

I do not in this present application claim a series of burners constructed and arranged to produce interlocking flames in directions at an angle to the horizontal. Neither do I claim in this present application the mechanical construction of the burners, as such, by which said interlocking flames are provided for, as hereinbefore explained, inasmuch as I propose to claim such series of burners constructed to produce such interlocking flames and such mechanical construction in a separate and distinct application for Letters Patent to be hereafter filed.

What I claim as my invention is—

1. In a gas cooking or heating oven, a heat-radiating bottom, $f$, and a series of gas-jets placed in the top of said oven, the whole combined and arranged to permit the article to be baked to be placed between and simultaneously subjected to the action of the heat-radiating bottom $f$ and of the naked flames of the gas-jets or the heat directly radiated from said flames, all substantially as and for the purpose herein set forth.

2. The oven A, having a series of gas-jets, $g$, in its upper part, and at its lower part the heat-radiating bottom $f$, and in its sides the opening $a$, in combination with the jacket C, having between it and the oven A the space D, and provided at bottom with the opening F and at top with the opening $c$, all substantially as and for the purpose herein set forth.

3. The flanges $b'$, in combination with the series of gas-jets $g$, placed in the upper part of the oven A, the said oven being constructed with the openings $a'$ in its sides, substantially as and for the purpose herein set forth.

ALBANUS W. MORTON.

Witnesses:
CHAS. H. T. DOXAT,
H. F. PARKER.